A. R. BIEBER.
WEATHER VANE.
APPLICATION FILED JULY 6, 1916.
1,265,420.
Patented May 7, 1918.
2 SHEETS—SHEET 1.
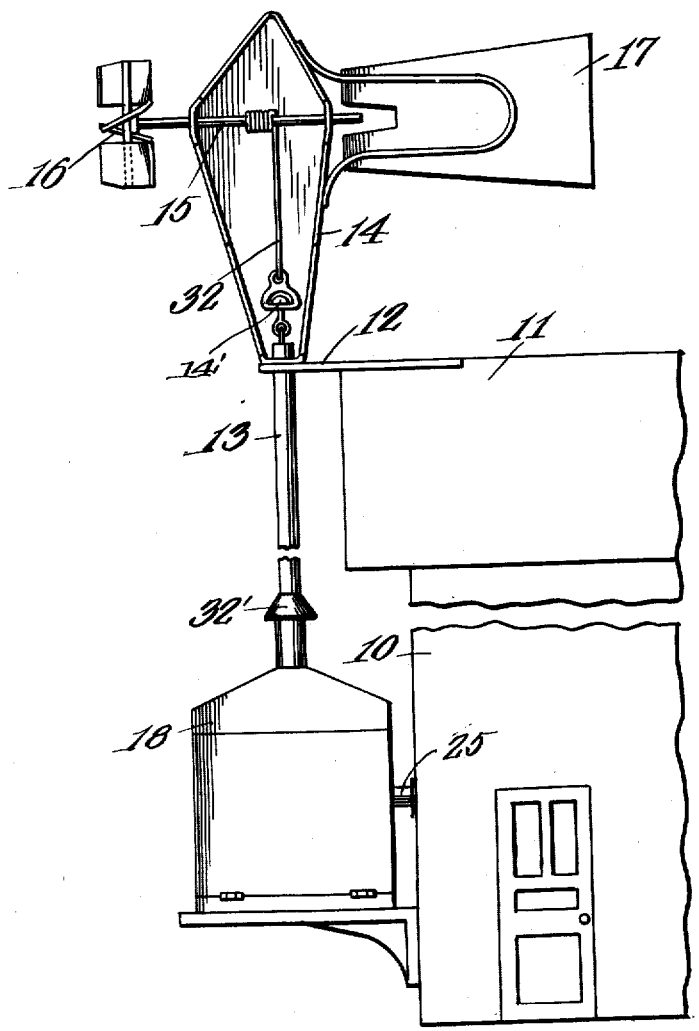
Fig. 1.
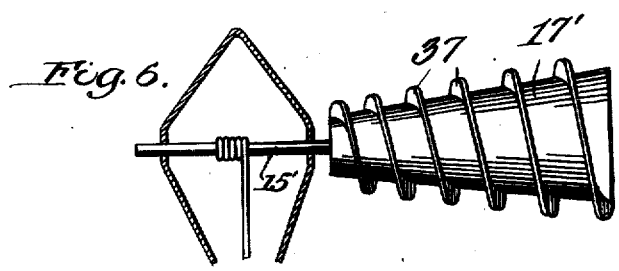
Fig. 6.
Witnesses
James F. Crown
N. M. Test
Inventor
A. R. Bieber
Attorneys

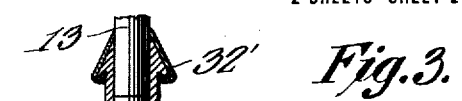
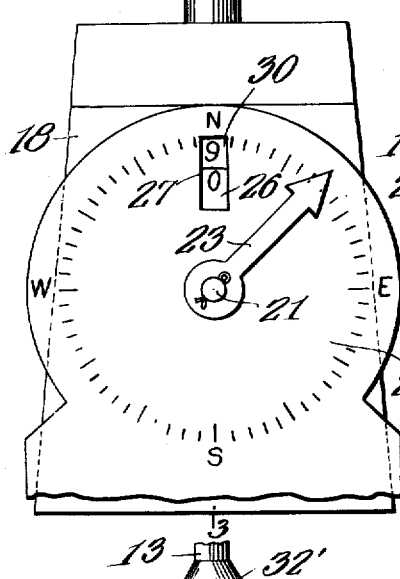
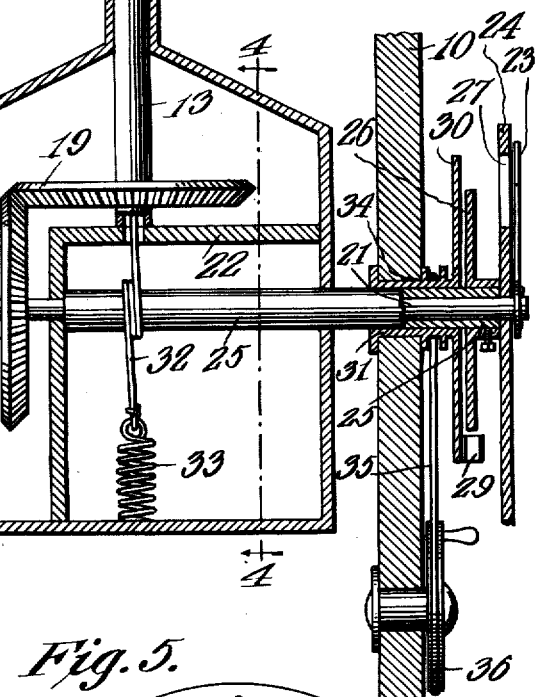
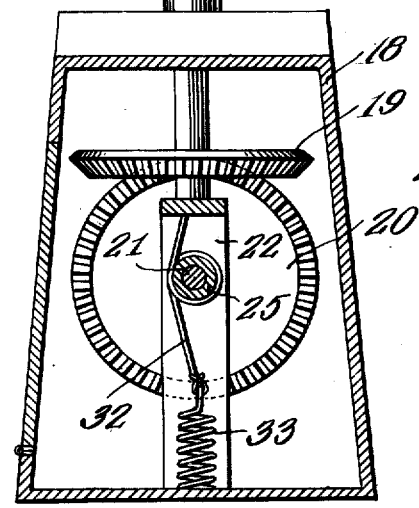
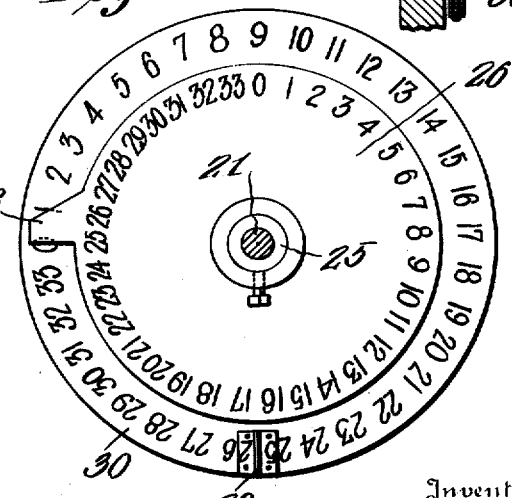

UNITED STATES PATENT OFFICE.

ALEXANDER R. BIEBER, OF SWISS, MISSOURI, ASSIGNOR OF ONE-HALF TO ALBERT I. BIEBER, OF SWISS, MISSOURI.

WEATHER-VANE.

1,265,420.

Specification of Letters Patent. Patented May 7, 1918.

Application filed July 6, 1916. Serial No. 107,831.

*To all whom it may concern:*

Be it known that I, ALEXANDER R. BIEBER, a citizen of the United States, residing at Swiss, in the county of Gasconade, State of Missouri, have invented certain new and useful Improvements in Weather-Vanes; and I do hereby declare the following to be a full, clear, and exact description of the invention, such as will enable others skilled in the art to which it appertains to make and use the same.

This invention relates to improvements in weather vanes and anemometers.

One object of the invention is to provide a weather vane which not only will indicate the direction of the wind, but which will also indicate the speed of the wind.

Another object is to provide a device of this character which is adapted to be placed on the roof of a house or other building, and so constructed and arranged that the speed and direction indicator can be seen within the building.

A further object is to provide a device in which the speed of the wind will not only be indicated, but the maximum speed will be registered on a dial, which will remain in such position after the indicator has changed its position and until reset by hand.

Other objects and advantages will be apparent from the following description when taken in connection with the accompanying drawing.

In the drawing:

Figure 1 is an elevation of my device as applied to a building, the front of the casing 14 being removed.

Fig. 2 is an enlarged front elevation of the registering device.

Fig. 3 is a vertical sectional view taken on the line 3—3 of Fig. 2.

Fig. 4 is an enlarged sectional view through the said casing, on the line 4—4 of Fig. 3.

Fig. 5 is an elevation of the intermediate and inner dials.

Fig. 6 is a view of a modified form of the vane.

Referring particularly to the accompanying drawing, 10 represents the wall and 11 the roof of a house with which my invention is associated. Disposed vertically on the wall of the house, and secured thereto by suitable brackets 12, is a pipe casing 13, on the upper end of which, and disposed above the roof of the house, is mounted a rotatable casing 14. Rotatably mounted in the frame is a horizontal shaft 15, on one end of which is mounted a wind wheel 16. On the other end of the frame is mounted a vane or tail 17. Mounted on the wall of the house is a box or housing 18, into the upper end of which is secured the lower end of the pipe casing 13. This casing is rotatable, and carries on its lower end, within the housing, a horizontal pinion 19, which meshes with a pinion 20 carried on one end of the horizontally disposed shaft 21, mounted in the casing. The lower end of the casing 13, and a portion of the shaft 21 are supported by a frame 22 so that the pinions will be held in engagement. The shaft 21 extends through the wall of the house, and has mounted thereon a hand 23 adapted to traverse a dial 24, mounted on the wall within the house. This dial is marked with the points of the compass. Rotatably mounted on the shaft 21, and also projecting through the wall is a hollow shaft or sleeve 25 on which is rigidly secured and rotatable therewith, a dial 26. This dial has on its face numbers representing miles per hour which are adapted to be viewed through a slot 27 formed in the upper portion of the dial 24. On the periphery of the dial 26 is formed a projection 28 adapted to engage with a projection 29 on a dial 30 mounted on a sleeve 31 in the wall of the house, said sleeve serving as a bearing for the sleeve 25. Secured to and arranged to be wound on the shaft 15 is a cord 32, which extends downwardly through the pipe casing 13, into the housing 18, where it is given a couple of turns around the sleeve 25, and then has its other end secured to one end of a coil spring 33 secured to the bottom of the housing. Within the casing 14 the cord is provided with a swivel coupling 14' which prevents twisting of the cord and is arranged to engage against the upper end of the pipe 13 to limit the downward movement of the cord under the influence of the spring 33. A water-tight coupling 32' is provided where the pipe casing 13 enters the housing.

When the wind is directed against the weather vane, it will be swung around so as to impart motion to the gears 19 and 20, and to the shaft 21, thus moving the hand around the dial 24 to indicate the direction from which the wind is blowing. At the same time the wind will strike the blades of the wind wheel and rotate the same together with its shaft. This will wind the cord 32 on the shaft, and exert an upward pull on the portion around the sleeve 25, and cause a rotation of said sleeve, against the tension of the spring 33. This will rotate the dial 26, its numbers being readily seen through the opening 27. When the force of the wind against the wheel 16 reaches any predetermined point the spring 33 will have been stretched to its corresponding predetermined tension. Thus there will be a balance between the wind pressure and the spring tension which will hold the sleeve 25 stationary. The maximum force of the wind at that time can be readily ascertained by an inspection of the dial 30. The projection on the dial 26 will engage the projection 29 of the dial 30 and move the same around with it, but by reason of the fact that this dial 30 only moves when driven by the dial 26, it will remain in such position even after the dial 26 has moved backwardly away from it. The dial 26 is smaller than the dial 30 so that the numbers on the faces of both dials can be seen, one above the other through the opening 27.

Secured to the back of the dial 30 is a hub portion 34, and engaged over this hub portion is a cord 35 which extends downwardly around a pulley 36 within convenient reach for the purpose of resetting the dial 30.

Thus there is provided a device which will accurately indicate the direction and speed of wind, and which will at the same time show the maximum speed of the wind, even after the wind has ceased.

Fig. 6 shows a modified form of vane which includes a conical body 17' secured to one end of the shaft 15'. On this body is arranged a helicoidal rib 37, secured to the body by one of its edges. With this form, the wind wheel 16 and tail 17 are done away with, the shaft being rotated by the vane, which is turned by the engagement of the wind against the rib.

What is claimed is:

1. An anemometer comprising a wind wheel, a stationary dial having an opening, a vane, an indicating hand for traversing the dial, driving connections between the vane and the hand, a movable dial, visible through the opening of the stationary dial, driving connections between the wheel and the movable dial, and a third dial visible through the opening of the stationary dial and driven by the first movable dial.

2. An anemometer comprising a vane and a wind wheel, a shaft, driving connections between the shaft and the vane, a shaft carried concentrically on the first shaft, driving connections between the concentric shaft and the wind wheel, a stationary dial having an opening therethrough, a hand carried by the first shaft for traversing the dial, a dial carried by the second shaft and visible through said opening, a lug on the second dial, and an idly mounted dial also visible through the said opening, and a lug on said idly mounted dial for engagement by the first lug to advance said idly mounted dial.

In testimony whereof, I affix my signature, in the presence of two witnesses.

ALEXANDER R. BIEBER.

Witnesses:
  EDW. HAMMELMAN,
  MIKE BIEBER.